Jan. 28, 1941. S. MYERSON 2,230,164
METHOD OF MAKING ARTIFICIAL TEETH
Filed June 1, 1939   3 Sheets-Sheet 1

Inventor
Simon Myerson
by Roberts Cushman Woodbury
Attys

Jan. 28, 1941.   S. MYERSON   2,230,164
METHOD OF MAKING ARTIFICIAL TEETH
Filed June 1, 1939   3 Sheets-Sheet 2
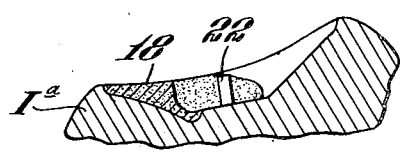
Fig. 23
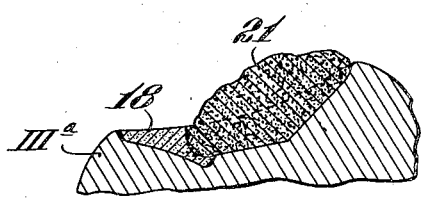
Fig. 24
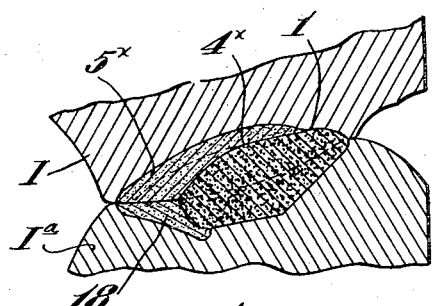
Fig. 25
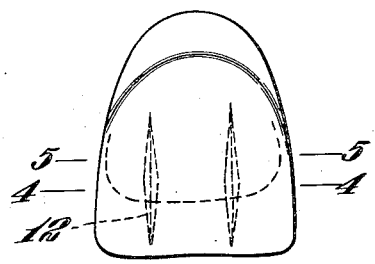
Fig. 3
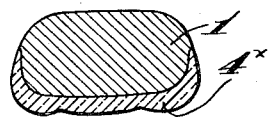
Fig. 5
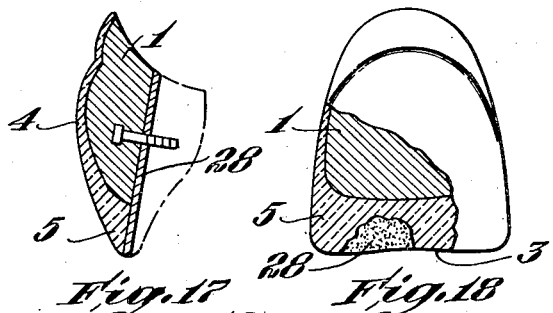
Fig. 17   Fig. 18   Fig. 4
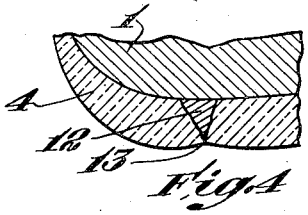
Fig. 21ᵐ
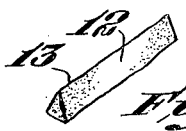
Fig. 6
Fig. 21
Inventor
Simon Myerson
by Roberts Cushman & Woodberry
Attys.

Jan. 28, 1941. S. MYERSON 2,230,164
METHOD OF MAKING ARTIFICIAL TEETH
Filed June 1, 1939 3 Sheets-Sheet 3

Inventor
Simon Myerson
by Roberts Cushman Woodbury
att'ys.

Patented Jan. 28, 1941

2,230,164

UNITED STATES PATENT OFFICE 2,230,164

METHOD OF MAKING ARTIFICIAL TEETH

Simon Myerson, Brookline, Mass.

Application June 1, 1939, Serial No. 276,838

13 Claims. (Cl. 18—55.1)

This invention pertains to artificial teeth and relates more especially to a novel method of making artificial teeth whereby to produce effects which closely simulate natural teeth, the present application being a continuation-in-part of the copending applications for Letters Patent of the United States, Serial Nos. 104,039, 180,725 and 78,674, all filed by Simon Myerson on October 5, 1936, December 20, 1937 and May 8, 1936, respectively. Patents Nos. 2,202,712 and 2,202,713, dated May 28, 1940, have been issued upon the above applications Serial Nos. 104,039 and 180,725, respectively. The copending applications just referred to concern inventions in artificial teeth largely based upon applicant's discovery that an artificial tooth must closely simulate a natural tooth when it comprises a body portion of relatively opaque material and a labial surface layer of a relatively transparent enamel which extends beyond the lower limit of the body portion to form an incisal cap, said relatively opaque and transparent portions meeting and merging in a contact zone whose nearest approach to the incisal edge is at a substantial distance from the latter, for instance approximately 0.125 inch, the contact zone gradually receding from the lingual face of the tooth as it approaches the incisal edge so that the effective transparency of the incisal portion progressively increases toward the incisal edge. A tooth so constructed, when viewed against the darkness of the oral cavity, shows a dark incisal fringe which gradually merges with the body portion. Ancillary to this valuable discovery, it was further found that if, during moulding, one or more bodies of definite size and shape and of contrasting degrees of opacity or color with respect to the transparent incisal portion were embedded in the enamel-forming slip or disposed between the labial enamel layer and the opaque body portion, effects closely simulating the cracks, stains, or other irregularities of natural teeth could be obtained, whereas, prior to the present invention, the dentist, desiring natural effects, was obliged to buy a ready-made tooth and then proceed to apply stains in the endeavor to make the tooth look more natural. This is a costly procedure, consumes considerable time, and the results are often very disappointing.

The principal object of the present invention is to provide an improved method of making artificial teeth embodying the improvements set forth in said copending applications and hereinabove briefly outlined.

It is acknowledged that manufacturers of artificial teeth for many years have endeavored to make such teeth resemble natural teeth but, so far as is known, they have not been successful in achieving the desired results. However, by following the improved method herein disclosed, it becomes practical by factory production to make artificial teeth having such a natural appearance and characteristics that the most meticulous dentist can obtain teeth from the manufacturer all ready for use, such teeth having permanently incorporated in them the characteristics of the worn teeth of adults, such as enamel cracks, face erosion, worn incisal edges, decalcified spots, thin enamel, and stains of various kinds.

In accordance with the usual procedure in the manufacture of artificial teeth, the body and enamel portions of the tooth are prepared by pulverizing proper minerals and mixing them to produce porcelain-forming powders. These powders are then made ready for use by mixing them with solutions of gums or with starches, flours or the like, to form a plastic slip. The tooth mould usually consists of two parts; one part to form the labial face of a tooth, for example an anterior tooth; and the other part to form the lingual face and the ridge lap. The mould parts are provided with coacting dowel pins and corresponding sockets so that the parts of the mould may easily and accurately be placed in registration. Suitable quantities or masses of enamel and body-forming slips respectively are then packed into the two parts of the mould, and the mould parts are brought into registry with the assistance of the dowel pins and pressed together until they are in firm contact with each other,—a screw press usually being employed for this purpose. The closed mould is then put into a heater press where it is firmly held together while being heated and until the slip has become hard enough to permit the "green" tooth to be knocked from the mould. Thereafter the tooth is fired at such a temperature and for such a period of time as to cause the enamel-forming slip to fuse.

In accordance with the present invention a body-forming slip is employed such that the body portion of the tooth is relatively opaque. On the other hand the enamel-forming slip is of such character that the enamel layer (or that portion of the tooth which consists of enamel) is relatively translucent or even transparent. In accordance with the present invention, one or more solid bodies of predetermined size and shape may be inserted into the material which is to form the body or enamel portions of the tooth. I contemplate the use of pieces of one or more different qualities with respect to light penetration in the same tooth, and the use of pieces which may vary from actual transparency to a considerable opacity. These inserted solid bodies may be of any desired thickness, but are preferably so disposed in the slip material in the mould as to be substantially embedded in such slip material. By this means I can accurately control the appearance of the tooth at any given point since I can provide an area or areas of any desired degree of transparency or translucency by reason of the fact that the inserted pieces, particularly if previously fused, substantially retain their shapes and original degrees of transparency during the burning of the tooth.

In accordance with the preferred procedure, the incisal edge portion and also, if desired, the lateral margins, or portions of such lateral margins, are of substantially transparent colorless enamel. For certain special effects the enamel may constitute merely a surface layer, but preferably it forms a body of substantial dimensions constituting in effect a cap projecting well beyond the lower edge of the body portion and having lingual and labial surfaces of substantial extent. A tooth thus provided with a relatively opaque body portion and a relatively transparent cap portion much more nearly simulates the natural tooth when viewed against the dark background of the oral cavity than do artificial teeth made by prior methods. In accordance with the present invention, one may embed a comparatively thin piece of solid material, as above refrred to, in the slip which is to form the enamel, so as to change the transparency of the latter at a given point. One may also reproduce the effect, often found in natural teeth, of an opaque light colored area distinct from the surrounding portions of the tooth, by selecting a suitable ceramic piece, for example, a partly hardened ceramic slip or a solid piece of porcelain of a color lighter than the body portion of the tooth which is to be made, and embed such piece in the slip in the mould so that it lies close to the labial face of the tooth where it is visible through the enamel. By following this practice one is able very accurately to predetermine the results to be obtained in the completed tooth. This is by no means possible by any other method, for it is very difficult and at best uncertain so to fuse an artificial tooth, made merely of plastic slips having different qualities, as to produce an opaque, semi-opaque or transparent area of definite shape and size and of a degree of transparency substantially different from that of the remainder of the tooth. Very slight variations in heat will affect the results, and cause failure in a high percentage of cases when it is attempted to produce such light reflection effects merely by moulding plastic slips.

The slip which forms the enamel cap may be such as to yield a translucent enamel, and by embedding a substantially transparent solid body therein, one can obtain gray or blue shadow effects at the surface when the tooth is viewed against the darkness of the oral cavity, whereas when it is held between the eye and a source of light, the location of the transparent insert appears as a bright area.

In constructing a tooth according to this invention, it is found that the preformed inserts do not lose their shapes nor overburn, although they become intimately fused with the remainder of the tooth.

In the drawings

Fig. 3 is a labial view of a tooth, to large scale, embodying certain features of the invention, in particular a light-transmitting incisal portion and inserts simulating stains or cracks in the enamel;

Fig. 4 is a fragmentary section, to larger scale, on the line 4—4 of Fig. 3;

Fig. 5 is a section on the line 5—5 of Fig. 3;

Fig. 6 is a perspective view, to large scale, illustrating an insert useful in making the tooth of Fig. 3;

Figure 16:
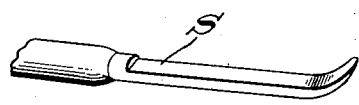
Fig. 16 is a perspective view of a blending tool which may be used in the practice of the present invention.

Fig. 16ᵃ is a fragmentary view of a blending tool of a different type useful in particular in making teeth of the kind shown in Figs. 3 and 4;

Fig. 16ᵇ is a section on the line 16ᵇ—16ᵇ of Fig. 16ᵃ;

Fig. 17 is a vertical section illustrating a tooth of somewhat different type designed in particular for use with a backing member;

Figure 19:
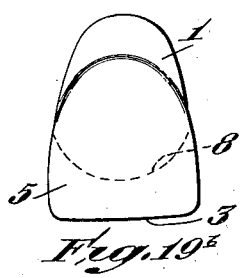
Figure 19:
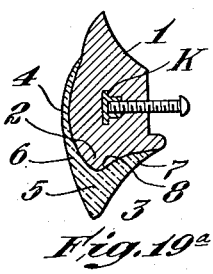
Figure 19:
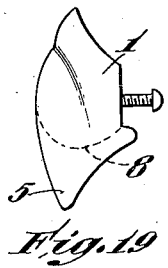

Fig. 18 is an elevation of the tooth of Fig. 17, showing the labial surface of the tooth but with a portion of the material of the tooth broken away to expose a masking layer;

Fig. 19 is a side elevation of a tooth of simple form embodying certain features of the invention, in particular a transparent or translucent incisal portion;

Fig. 19ᵃ is a vertical section illustrating the interior construction of the tooth of Fig. 19;

Figure 2:
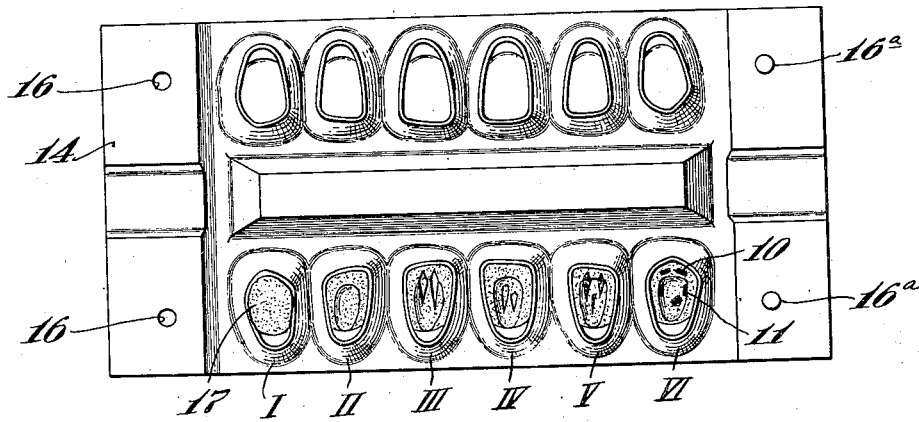
Fig. 2 is a plan view of the labial mould block 5 which is associated with the block of Fig. 1.
Figure 21A:
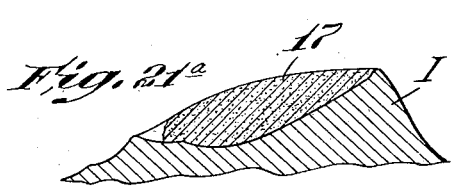
Figure 22:
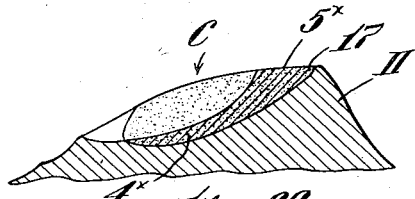
Figures 22A, 22B:
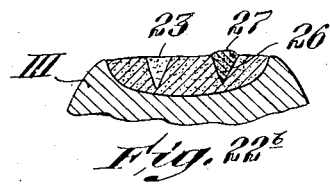
Figure 20:
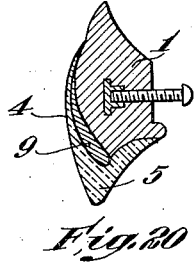

Fig. 19ᵇ is an elevation showing the labial surface of the tooth of Fig. 19;

Fig. 20 is a section similar to Fig. 19ᵃ but illustrating a modification wherein an intermediate layer of material is interposed between the enamel surface layer and the body portion;

Fig. 21 is a diagrammatic transverse section through the incisal portion of the mould cavity I of Fig. 2, illustrating an early step in the process of packing the mould cavity;

Fig. 21ᵃ is a longitudinal section to large scale through cavity I of Fig. 2 also illustrative of the same step in the process;

Fig. 21ᵐ is a diagrammatic longitudinal section through mould cavity Iᵃ, illustrating an early step in packing said cavity;

Fig. 22 is a longitudinal section, to larger scale, through mould cavity II of Fig. 2, illustrating the results of a further step in the process;

Figure 1:
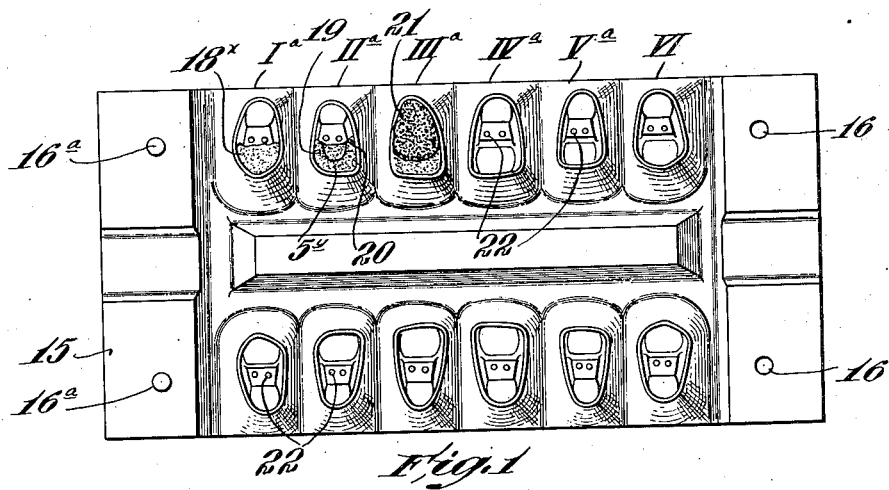
Fig. 1 is a plan view, substantially to actual size, of a lingual mould block useful in the practice of the present invention.
Figure 26:
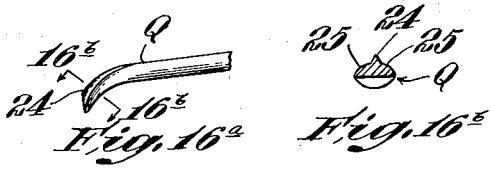
Figure 26:
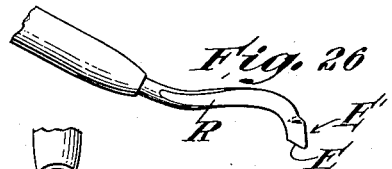

Fig. 22ᵃ is a perspective view illustrating an insert which may be employed in forming imitation stains or cracks of the kind illustrated in the tooth of Fig. 3;

Fig. 22ᵇ is a transverse section through mold cavity V of Fig. 2, illustrating the step of placing an insert within the mould cavity as a further step in the process;

Fig. 23 is a fragmentary longitudinal section through the mould cavity Iᵃ of Fig. 1, illustrating an early stage in packing said cavity;

Fig. 24 is a fragmentary longitudinal section, to large scale, through the mould cavity IIIᵃ of Fig. 1, showing a later stage in the process of packing the mould;

Fig. 25 is a fragmentary longitudinal section showing the mould blocks assembled and with the mould cavities I and Iᵃ associated to form a complete tooth;

Fig. 26 is a perspective view illustrating an incising and inserting tool; and

Figure 27:

Fig. 27 is a bottom plan view of the tool shown in Fig. 26.

The tooth illustrated in Figs. 19, 19ᵃ and 19ᵇ embodies the broad principles of the invention and is more fully described in application Serial No. 68,674, above referred to. Said application also discloses in detail the tooth illustrated in Fig. 20. The tooth illustrated in Figs. 19, 19ᵃ and 19ᵇ comprises a body portion 1 of relatively opaque material which tapers downwardly to form the spur 2, but which terminates short of the incisal edge 3,—the distance between the tip of the spur 2 and the incisal edge 3 preferably being of the order of ⅛ inch. An enamel layer 4 of relatively transparent material covers the labial surface of the tooth and is extended downwardly below the lower edge of the body portion to form in effect a cap 5 having a socket in its upper surface in which the tapered end or spur 2 of the body portion is embedded. The cap-forming enamel constitutes the incisal edge and also the lower lateral margins of the tooth. In vertical section, as shown in Fig. 19ᵃ, the enamel cap is of more or less sagittate contour, having the upwardly directed labial and ligual cusps 6 and 7. As thus arranged the relatively transparent enamel-forming material is so blended with the more opaque and usually colored body material that the finished tooth has a fringe including the incisal edge which may be of substantially complete transparency, the tooth gradually becoming less transparent toward its mid-portion, the body portion being as opaque and of such color as may be desired. The result of this improved construction is that when the tooth is in use and viewed against the dark oral cavity the incisal portion takes on a bluish shadowy appearance closely simulating the natural tooth, such appearance varying with different light conditions and changes in perspective as it does in a natural tooth. Teeth thus constructed are almost indistinguishable from natural teeth even under the most trying light conditions, for example, when viewed at night by artificial light. The body and incisal portions meet and merge in a contact zone 8 whose nearest approach to the incisal edge is a substantial distance (as above suggested about ⅛ inch) from the latter, said contact zone gradually receding from the labial face of the tooth while concomitantly approaching the incisal edge whereby the light-obstructing effect of the relatively opaque body portion gradually diminishes and the effective transparency of the incisal portion gradually increases toward the incisal edge. As already noted the incisal portion or cap has a downwardly directed cavity, forming in effect a socket for the reception of the lower part of the downwardly directed tapering portion or spur 2 of the body portion, said spur being embedded in and fused with the material forming the walls of the socket in the cap, thereby insuring a very firm union of the parts.

In order to obtain an even finer graduation and blending of light effects, the construction shown in Fig. 20 may be employed wherein a layer 9 of material of a transparency intermediate those of the body portion and incisal cap is interposed between the labial surface of the downwardly tapering lower part of the body portion and the labial enamel layer.

Figure 7:
Fig. 7 is an elevation showing the labial surface of a tooth embodying other features of the invention, in particular an insert designed to impart a cloudy effect to the tooth;
Figure 8:
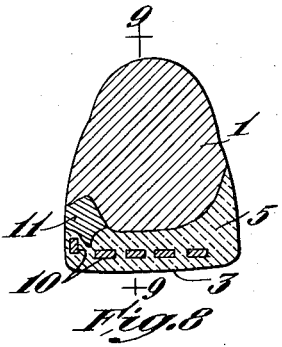
Fig. 8 is a vertical section, on a plane substantially parallel to the labial surface of the tooth, illustrating the use of inserts of various types embedded within the substance of the tooth.
Figure 9:
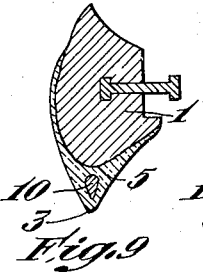
Fig. 9 is a vertical section substantially on the line 9—9 of Fig. 8.
Figure 10:
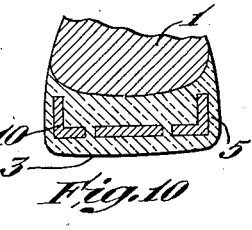
Fig. 10 is a view similar to Fig. 8, but showing inserts of a different shape.

To obtain an even closer simulation of the natural tooth than that afforded by the construction shown in Figs. 19, 19ᵃ, 19ᵇ and 20, it is proposed, as suggested in application Serial No. 104,039 above referred to, to introduce into the substance of the tooth during moulding, small bodies or inserts of a material designed to control light and color effects in the finished tooth not obtainable by any of the previous methods of making moulded teeth. A tooth embodying this feature is illustrated in Figs. 7 to 15 inclusive, the teeth shown in these views being in general similar to that illustrated in Fig. 19 but having embedded within the incisal portion, or partly within the incisal portion and partly within the body portion, or wholly above the incisal portion, inserts of a material having different light-transmitting or reflecting characteristics from that of the material in which it is embedded, or by which it is covered. The inserts employed for this purpose are preferably of ceramic material and preferably solid pieces of definite predetermined size and shape which may be prebaked, or if desired, fired, so that they will maintain the predetermined shape initially imparted to them after they have been incorporated in the tooth and while the latter is being fired. By using preshaped inserts it is possible to insure the exact effect desired in the finished tooth. These inserts may be of a material more transparent or less transparent than that in which they are embedded, or they may be of opaque material of a definite color designed to contrast with the material in which they are embedded or by which they are overlain. As illustrated in Figs. 8 to 11 inclusive, the tooth includes one or more of the solid inserts 10 embedded wholly within the material forming the incisal cap 5. However, the tooth may have inserts 11 set in other portions of the tooth, as illustrated in Figs. 3, 7 and 8.

Figure 11:
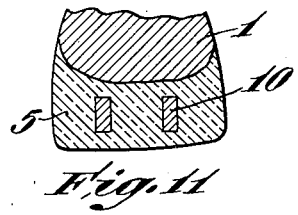
Fig. 11 is a fragmentary view similar to Fig. 10 but showing inserts of another shape;
Figure 12:
Figs. 12, 13, 14 and 15 are perspective views, to large scale, illustrating inserts of different shapes which may be employed in making the improved tooth in accordance with the present invention.
Figure 14:

The inserts are usually quite thin and small and as many as five or six or more may be used in a single tooth to obtain the desired effect, several such pieces being shown in the teeth illustrated in Figs. 8 to 11. On the other hand, the embedded insert or inserts may be larger, as shown in Fig. 11. A single piece may be all that is required for some purposes. In Fig. 8 the narrow solid inserts are shown predominantly disposed with their longer edges horizontal. In Fig. 11, on the other hand, these pieces are shown with their longer edges substantially vertical. The inserted irregular piece 11 of Figs. 7 and 8 may be opaque, for instance white or very light in color, or it may be of any appropriate shade desirable for the purpose. As shown, this piece is so disposed with respect to the body portion of the tooth as to be covered by the labial enamel layer and to be visible through the enamel, thus imparting the clouded effect often occurring in a natural tooth.

Natural teeth, particularly those of adult persons, often exhibit narrow, more or less parallel dark lines or stains extending substantially perpendicular to the incisal edge, such dark lines usually resulting from the presence of fine cracks in the enamel. In accordance with the present invention, artificial teeth may readily be constructed which have narrow streaks or shadow lines closely simulating those of natural teeth, such streaks or shadow lines being a permanent part of the tooth structure and introduced during the manufacture of the tooth. A tooth embodying this feature is illustrated in Figs. 3, 4, 5 and 6, and is more fully described in application Serial No. 180,725, above referred to. Said application also described a mode of so masking an opaque backing which may be employed in mounting the tooth, that even though the tooth be of the type above described, wherein the incisal portion is translucent or even substantially transparent, the opaque backing material will not show through the incisal portion, but the tooth will appear substantially the same when viewed against the darkness of the oral cavity as though the opaque backing were not present. A tooth so constructed is illustrated in Figs. 17 and 18.

In order to simulate the narrow streaks or strains commonly found in natural teeth the artificial tool comprises inserts 12 (Figs. 3 to 6) of a material of a different degree of transparency from that of the labial enamel layer 4 and body portion 1 of the tooth, for example, these inserts may be of a material less transparent than the enamel 4 and colored to any desired degree. In order to obtain the most natural and desirable effects these inserts should have very narrow forward edges, preferably approaching a knife edge sharpness, and these forward thin edges 13 should lie substantially in the plane of the outer surface of the enamel. As illustrated in Figs. 4 and 6, these inserts take the form of elongated wedges or, if desired, triangular prisms, desirably of slightly irregular contour. These inserts, like those illustrated in Fig. 8, for example, are of ceramic material which is first shaped to the desired contour and then fused before introduction into the tooth-forming material or they may be made of a suitable porcelain slip shaped to the desired size and contour and then without previous baking or fusion embedded in the materials from which the tooth is moulded. These narrow inserts may be so located as to lie wholly below the lower limit of the relatively opaque body-forming material, or wholly above such lower limit, or, as shown in Fig. 3, they may extend upwardly from the incisal edge to any desired extent toward the gingival portion of the tooth, and any desired number of such inserts may be introduced.

The improved method of making artificial teeth forming the subject matter of the present invention and by the practice of which teeth having the novel and desirable characteristics above described may readily be obtained, is substantially as follows, it being understood that the teeth will be moulded in moulds of usual type, for example two part moulds, as illustrated in Figs. 1 and 2, wherein one mould block 14 is provided with that part of the mould cavity which forms the labial face of the tooth and the other mould block 15 is furnished with the complemental portion of the cavity and is designed to shape the lingual surface of the tooth. Customarily the mould blocks are so devised as to have a plurality of cavities so that several teeth, for example twelve, may be moulded at the same time. Thus, as indicated in Figs. 1 and 2, the labial mould block 14 is provided near one edge with a series of cavities I, II, III, IV, V, and VI, designed simultaneously to form the labial surfaces of six teeth, while near the opposite edge of the same block there is arranged a similar row of cavities designed to form the labial surface of six other teeth. The lingual mould block 15 is likewise provided with rows of cavities, the cavities I$^a$, II$^a$, III$^a$, IV$^a$, V$^a$ and VI$^a$ being complemental to the cavities I, II, III, etc., and being designed to form the lingual surfaces of the teeth. To facilitate proper registration of the cavities of the two mould blocks, dowel-pins 16 and sockets 16$^a$ are provided.

Let it be assumed that the tooth manufacturer has the proper moulds. He must then provide himself with porcelain slips of the desired qualities, such slips being known and obtainable by the manufacturer. It is preferable that the enamel-forming slip be of a type which will dry and become hard quite quickly, while the body-forming slip remains plastic for a somewhat longer period. This can readily be accomplished by the proper choice of binders, for instance flour paste, gum tragacanth, and by the use of greater or lesser quantities of water in mixing the slip.

The first step in the process is illustrated by reference to the left-hand mould cavity I in the labial mould block 14 and by reference to Figs. 21, 21$^a$ and 2, it being understood that this and the following steps will be carried out with reference to each of the cavities in the labial mould block. This first step preferably consists in substantially filling the labial cavity with enamel slip 17, as shown in Figs. 21 and 21$^a$. Then by the use of a suitable tool, for example a blending tool 18 such as shown in Fig. 16, a portion of the enamel slip 17 is scooped out, as shown in Fig. 22, so as to leave an incisal mass 5$^x$ of substantially the desired thickness and extending from the incisal edge toward the gingival end of the tooth, a distance, for example, approximately ⅛ inch, although this particular distance is cited merely as indicative that the incisal mass is of substantial depth measured from the incisal edge and is not merely a coating or surface finish. The scooping out of the central part of the enamel slip from the mould cavity leaves a shallow depression C and provides the cavity with a lining 4$^x$ of the enamel-forming slip which integrally merges with the incisal mass 5$^x$ and which may extend to the gingival end of the mould cavity or which may terminate at any desired point and may extend even to the gingival face of the tooth, as illustrated in Fig. 17, but which preferably is quite thin, as compared with the thickness of the incisal mass 5$^x$ and which may be of more or less uniform thickness except where it merges with the incisal mass.

If the tooth is to be of the simple type, illustrated in Fig. 19 for instance, the next step is to deposit enamel-forming slip 18 in the corresponding lingual mould cavity I$^a$ (Fig. 1). In packing the enamel-forming slip 18 in this cavity it is unnecessary completely to fill the cavity, the slip substantially filling the incisal portion of the cavity but gradually tapering in thickness, and ordinarily stopping before reaching the midportion of the cavity. The material 18 is then shaped, for example by the use of the blending tools of Fig. 16, so that it becomes of more or less U-shape in plan, as shown in the mould cavity II^a of Fig. 1,—comprising an incisal mass 5^y corresponding in general to that in the corresponding labial cavity but having the tapering lateral horns or legs 19 and 20 which extend along the sides of the mould cavity toward the gingival end. Having packed the enamel-forming slip in the cavities I and II^a, the operator then deposits within one or both of the mould cavities, for example in the cavity I^a, sufficient body-forming slip 21 in the aggregate completely to fill that portion of the cavity of the assembled moulds not occupied by the enamel-forming slip. After all of the cavities of the mould blocks have thus been supplied with enamel and body-forming slip, the two mould blocks are assembled and placed in a press or presses where they are subjected to substantial pressure and preferably to heat, so as to bake the teeth and harden them sufficiently to permit them to be removed as "green teeth" from the mould. These teeth may then be trimmed to remove any fins or burrs left as a result of the moulding operation and are then fired at a temperature high enough to fuse the enamel-forming slip.

It will be understood that the lingual mould block 15 may be furnished with any usual means for the formation of or to facilitate the introduction of anchorage elements into the completed tooth. As indicated in Fig. 1, the mould block 15 is furnished with pins 22 designed to position small metallic collets K (Fig. 19^a) or the like, which are embedded in the tooth-forming slip during the moulding operation and which may be internally screw threaded or otherwise designed to constitute anchorage elements for mounting pins.

If it be desired to make a tooth of the type illustrated in Figs. 8 to 15, for example, the manufacturer first provides himself with inserts 10, as shown, for example, in Figs. 12 to 15, of any desired shape and dimensions and which are preferably of porcelain or other ceramic material and which may be moulded and baked or fused or otherwise formed prior to use. After the enamel-forming slip 17 has been packed into the labial mould cavities, any desired number of these preformed inserts 10 may be placed in the mould cavity, for example as illustrated in the cavity VI of Fig. 2, such inserts 10 being partially embedded in the enamel-forming slip if desired, or merely disposed so as to rest upon the exposed inner surface of such slip. If desired these bodies may be disposed so as to lie wholly within the incisal mass 5^x or to lie wholly above the incisal mass, or they may extend partly into the incisal mass and project therefrom into the scooped-out central depression C, so that the projecting end overlies the lining portion 4^x of the enamel-forming slip. If it be desired to impart to the tooth the cloudy effect which is quite commonly met with in natural teeth, an irregular insert 11 is disposed upon the lining 4^x of the cavity, as shown in the mould cavity VI of Fig. 2. This insert may be whitish in color or of any desired shade and is preferably so disposed upon the inner surface of the lining as to be partially embedded in the body-forming material when the mould is assembled. It is understood that the corresponding lingual mould cavity will be packed as above described; that the mould parts will be assembled; and the tooth baked and then withdrawn from the mould and fired. The inserts then produce distinct and definite shadow or color effects so that it is thus possible to obtain very definite and predetermined results such as very closely to simulate natural teeth.

In producing teeth having a stained appearance such as illustrated in Figs. 3 and 4, the manufacturer first proceeds as above described to dispose enamel-forming slip in the corresponding lingual mould cavities II and II^a, respectively, and then by the use of a suitable tool Q, for example as shown in Figs. 16^a and 16^b, makes incisions 23 either in the lining material 4^x alone, as shown at the mould cavity IV of Fig. 2, or in the lining 4^x and incisal mass 5^x, as shown in mould cavity III of Fig. 2, or if preferred wholly in the incisal mass, such incisions being conveniently made by a sharp tapering fin 24 projecting from the face of the tool, so that the incisions are more or less wedge-shape in transverse section, each such incision having a sharp forward edge which preferably extends substantially through the enamel-forming material to the inner surface of the mould cavity. Preferably the blending tool of Fig. 16^a is so shaped that in cutting the incisions into the lining material the latter is automatically reduced to the desired front-to-rear thickness by the overhanging shoulder portions 25 of the tool.

Instead of using the tool Q, an instrument of the type shown at R (Fig. 26) may be employed. This instrument R has a knife-like edge E for use in making the incisions, and preferably has a roughened surface E'.

Figure 13:
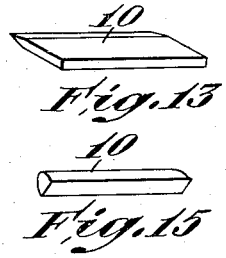
Figure 15:

Pieces 26 (Fig. 22^a) of ceramic material, preferably of a color contrasting with that of the enamel or which differ from the latter in light-transmitting qualities, are now provided. These pieces or inserts 26 may be like the insert 12 of Fig. 6, that is to say, wedge-shape or triangular in transverse section, and are preferably of more or less irregular shape or they may be thin blade-like pieces with sharp forward edges, as illustrated in Fig. 13. These pieces may, if desired, be baked or even fused before being placed in the incisions in the enamel-forming slip within the mould. The pieces 26 are of proper size and shape substantially to fill the incisions 23, although they may be of front-to-rear depth such as to project from the lining, as indicated at 27 (Fig. 22^b) so as to become embedded partially in the material which forms the central or body portion of the tooth. If these inserts are pre-baked or fused they will be hard enough so that they may be pushed into the enamel-forming slip in the mould without the use of a tool, although it is preferred to employ the tool in order to obtain more accurate results. As stated, the tool R has a surface E' which is somewhat roughened and to which the insert may temporarily be attached, while the insert is being placed in the incision in the mould lining by the use of the tool. If the insert be of hard material, it may be picked up and put in place by the use of pliers.

In moulding a tooth such as shown in Fig. 20 the mould may first be prepared, as indicated at mould cavity II of Fig. 2, and then, before assembling the mould blocks, a layer of slip of a slightly different degree of opacity may be deposited upon the lining portion 4^x of the enamel-forming slip, so as to extend from the incisal mass upwardly toward the gingival end of the cavity, so as to form the intermediate layer 9 in the finished tooth. Preferably this intermediate layer tapers in thickness from the point where it engages the incisal mass, toward its opposite extremity.

When it is desired to provide a tooth such as illustrated in Figs. 17 and 18, designed to be used against an opaque backing, the lingual wall of the tooth mould cavity may be made substantially flat. The labial cavity of the mould is now first packed as already described, and the lingual mould cavity is then packed with a thin flat layer of masking material. This masking material is preferably a ceramic slip and preferably of some neutral shade, for example gray, capable of absorbing light which is transmitted through the incisal portion of the completed tooth thereby to simulate the darkness of the oral cavity. Preferably this thin layer is given a more or less U-shape with wings extending along the lateral margins of the cavity toward the gingival end in the same way as described above with reference to the packing of cavity II$^a$ of the mould. The exposed face of this thin layer in the lingual mould cavity may be packed down and then roughened by the use of a suitable tool so as to give a matt finish.

While desirable modes of procedure have been outlined hereinabove, it is to be understood that the invention is not necessarily limited to the precise procedure described nor to the exact order of steps suggested, nor to the particular materials employed, but is to be regarded as broadly inclusive of any and all equivalents.

I claim:

1. That method of making artificial teeth of that kind in which a body of relatively opaque material is provided with an incisal cap of relatively transparent material and of a substantial depth below the lower end of the body, said cap forming the incisal edge and portions at least of the lateral edges of the tooth and having an upward extension overlying the labial surface of the body portion, whereby, when the tooth is viewed against the background of the oral cavity, the tooth appears to have a dark shadowy fringe, said method comprising as steps so disposing transparent enamel-forming slip in the labial cavity of a multi-part tooth mould as substantially to fill the incisal end of said cavity and to form a relatively thin lining for the remainder of the cavity, packing transparent enamel-forming slip into the incisal portion of the linqual cavity of the tooth mould, depositing relatively opaque body-forming slip in one or the other of the mould cavities sufficient completely to fill the balance of the cavity when the mould parts are assembled, assembling the mould parts, subjecting the tooth to pressure within the mould, removing the tooth from the mould and permanently hardening the tooth.

2. That method of making artificial teeth of that kind in which a body of relatively opaque material is provided with an incisal cap of relatively transparent material and of a substantial depth below the lower end of the body, said cap forming the incisal edge and portions at least of the lateral edges of the tooth and having an upward extension overlying the labial surface of the body portion, whereby, when the tooth is viewed against the background of the oral cavity, the tooth appears to have a dark shadowy fringe, said method comprising as steps packing a mass of transparent enamel-forming slip into the labial cavity of a multi-part tooth mould, hollowing out the central part of the mass of slip in such a way as, while leaving intact the incisal portion of the mass, to form a lining for the remainder of the cavity which gradually decreases in thickness toward the gingival end of the cavity, packing a mass of transparent enamel-forming slip into the incisal portion of the lingual cavity of the mould, depositing sufficient body-forming slip within one of the mould cavities completely to fill the remainder of the mould cavity when the mould parts are assembled, assembling the mould parts, baking the tooth, removing the tooth from the mould and firing the tooth.

3. That method of making an artificial tooth having a body portion of relatively opaque material and an incisal cap extending a substantial distance below the lower edge of the body portion and consisting of relatively transparent enamel, said method comprising as steps packing enamel-forming slip into the incisal end of the labial cavity of a multi-part tooth mould to form a mass completely filling said end, providing an integral extension of said mass to form a lining for the mould cavity extending toward the gingival end of the cavity, packng more of the enamel-forming slip into the incisal end of the lingual cavity of the mould so as to form a mass completely filling said end, depositing a body of ceramic material of different light-transmitting quality from the enamel so as to be embedded partially at least in one of the incisal masses of enamel-forming slip, packing body-forming slip of a character to form a relatively opaque body portion into one or both of the mold cavities in quantity sufficient to fill the remaining portion of the mould cavity when the mould parts are assembled, assembling the mould parts, subjecting the tooth to pressure in the mould, removing the tooth from the mould cavity and permanently hardening the tooth.

4. The method of producing an artificial tooth, of the kind having a relatively opaque body portion and a relatively transparent incisal cap extending to a substantial distance below the lower edge of the body portion, which consists in disposing a mass of enamel-forming slip within the labial cavity of a multi-part tooth mould, said slip being of a character such as to form a relatively transparent enamel, shaping the mass within the mould cavity to form an incisal portion of substantial depth and a lining portion which substantially covers the face of the mould cavity, disposing a mass of said enamel-forming slip in the incisal portion of the ligual cavity of the mould, shaping said latter mass to a generally U-form having a relatively deep incisal portion and narrow lateral extensions, disposing a mass of relatively opaque body-forming slip within the mould in sufficient quantity completely to fill the remainder of the mould cavity and to form the body portion of the tooth, assembling the mould parts, baking the tooth, removing the baked tooth from the mould and firing the tooth.

5. That method of making artificial teeth which comprises as steps packing a mass of transparent enamel-forming slip into the labial cavity of a multi-part tooth mould, hollowing out the central part of the mass of slip in such a way as, while leaving intact the incisal portion of the mass, to form a thinner lining for the remainder of the cavity, so indenting the lingual surface of the mass of enamel-forming slip as to form an elongate narrow groove reaching from said lingual surface substantially to the labial surface of the said mass of slip, depositing within said groove a body of material of different optical properties from the enamel, and thereafter completing the tooth.

6. That method of making artificial teeth which comprises as steps lining the labial cavity of a multi-part tooth mould with enamel-forming slip of a character such as to produce a relatively transparent enamel, so indenting the lining as to provide an elongate narrow groove tapering in width from the lingual toward the labial surface of the lining, providing a body of ceramic material of different light-transmitting qualities from the enamel, depositing said body in the groove in the lining, and thereafter completing the tooth.

7. That method of making artificial teeth which comprises as steps lining the labial cavity of a multi-part tooth mould with enamel-forming slip of a character such as to produce a relatively transparent enamel, so indenting the lingual face of the lining as to produce in the lining an elongate groove extending substantially perpendicular to the incisal edge of the labial cavity and which extends substantially through the lining, the groove decreasing in width forwardly, depositing within said groove a body of ceramic material of different light-transmitting qualities from the enamel, said body filling the groove and having a thin edge which substantially contacts the surface of the mould, and thereafter completing the tooth.

8. That method of making artificial teeth which comprises as steps lining the labial cavity of a multi-part tooth mould with enamel-forming slip, forming an elongate narrow indentation in the lingual face of the lining, said indentation decreasing in width forwardly and extending into the lining substantially to the surface of the mould, depositing within said groove a body of ceramic material of different light-transmitting qualities from the enamel, said body being of wedge-shaped transverse section and filling the groove and having an acute forward edge, and thereafter completing the tooth.

9. That method of making artificial teeth which comprises as steps lining the labial cavity of a multi-part tooth mould with enamel-forming slip, forming a plurality of elongate narrow indentations in the lingual face of the lining, each indentation extending substantially perpendicular to the incisal edge of the cavity and reaching substantially through the lining to the face of the mould, filling each of said indentations with a body of ceramic material having different optical properties from the enamel, and thereafter completing the tooth.

10. That method of making artificial teeth which comprises as steps lining the labial cavity of a multipart tooth mould with enamel-forming slip of a character such as to produce a relatively transparent enamel, forming in the lining an elongate narrow groove substantially triangular in transverse section with an acute angled edge of the groove disposed substantially at the labial surface of the lining, disposing in said groove an insert of ceramic material of different optical properties from the enamel, said insert filling the groove and decreasing in width forwardly, and thereafter completing the tooth.

11. That method of making artificial teeth which comprises as steps providing body slip suitable to form a relatively opaque tooth body portion, providing enamel slip suitable to form a relatively translucent enamel portion, providing a solid, difficultly fusible body of predetermined shape and size of less opacity than the body portion of the tooth to be made, packing body-forming slip and enamel-forming slip into a tooth mould, inserting said solid body so as to be completely surounded by the mass of slip, heating the mould, removing the moulded tooth from the mould, and heating the tooth to a temperature such as to fuse the enamel.

12. That method of making artificial teeth which comprises as steps packing a mass of enamel-forming slip into the labial cavity of a multi-part tooth mould, hollowing the central part of the mass of slip in such a way as, while leaving intact the incisal portion of the mass, to form a thinner lining for the remainder of the cavity, so indenting the lingual surface of the lining as to form an elongate narrow groove reaching from said lingual surface forwardly toward the labial surface of the lining, depositing within said groove material of different optical properties from the enamel, and thereafter completing the tooth.

13. That method of making artificial teeth which comprises as steps lining the labial cavity of a multi-part tooth mould with enamel-forming slip, said lining extending completely from the mesial to the distal edge of the cavity, forming a plurality of elongate narrow indentations in the lingual surface of the lining, each indentation extending longitudinally of the tooth and reaching forwardly toward the face of the mould, filling each of said indentations with ceramic material having different optical properties from the enamel, and thereafter completing the tooth.

SIMON MYERSON.